United States Patent [19]

Thomas et al.

[11] 4,043,121
[45] Aug. 23, 1977

[54] TWO-SPOOL VARIABLE CYCLE ENGINE

[75] Inventors: William W. Thomas; Elmore V. Sprunger, both of Cincinnati, Ohio

[73] Assignee: General Electric Company, Cincinnati, Ohio

[21] Appl. No.: 679,097

[22] Filed: Apr. 22, 1976

Related U.S. Application Data

[63] Continuation of Ser. No. 538,167, Jan. 2, 1975, abandoned.

[51] Int. Cl.² ............................................. F02K 3/06
[52] U.S. Cl. .................................. 60/204; 60/226 R; 60/262; 415/78
[58] Field of Search ............... 60/226 R, 262, 224, 60/204; 415/77-79

[56] References Cited

U.S. PATENT DOCUMENTS

| 3,182,898 | 5/1965 | Hewson | 60/226 R |
| 3,368,352 | 2/1968 | Hewson | 60/226 R |
| 3,449,914 | 6/1969 | Brown | 60/225 |
| 3,549,272 | 12/1970 | Bauger et al. | 60/226 R |
| 3,610,533 | 10/1971 | Johnson et al. | 60/262 |
| 3,750,402 | 8/1973 | Vdoviak et al. | 60/262 |
| 3,797,233 | 3/1974 | Webb et al. | 60/226 R |
| 3,841,091 | 10/1974 | Sargisson et al. | 60/262 |
| 3,867,813 | 2/1975 | Leibach | 60/225 |

FOREIGN PATENT DOCUMENTS 1,426,422  2/1969  Germany .......................... 60/226 R Primary Examiner—Carlton R. Croyle
Assistant Examiner—Robert E. Garrett
Attorney, Agent, or Firm—Robert C. Lampe, Jr.; Derek P. Lawrence

[57] ABSTRACT

An auxiliary fan is disposed upon the periphery of at least a portion of the fan of a conventional gas turbofan engine. Flow modulating components such as variable vanes and nozzles are utilized in conjunction therewith to produce a wide range of operating bypass ratios. Such an engine is one of the variable cycle variety and has the capability of operating efficiently at both subsonic and supersonic speeds.

14 Claims, 2 Drawing Figures

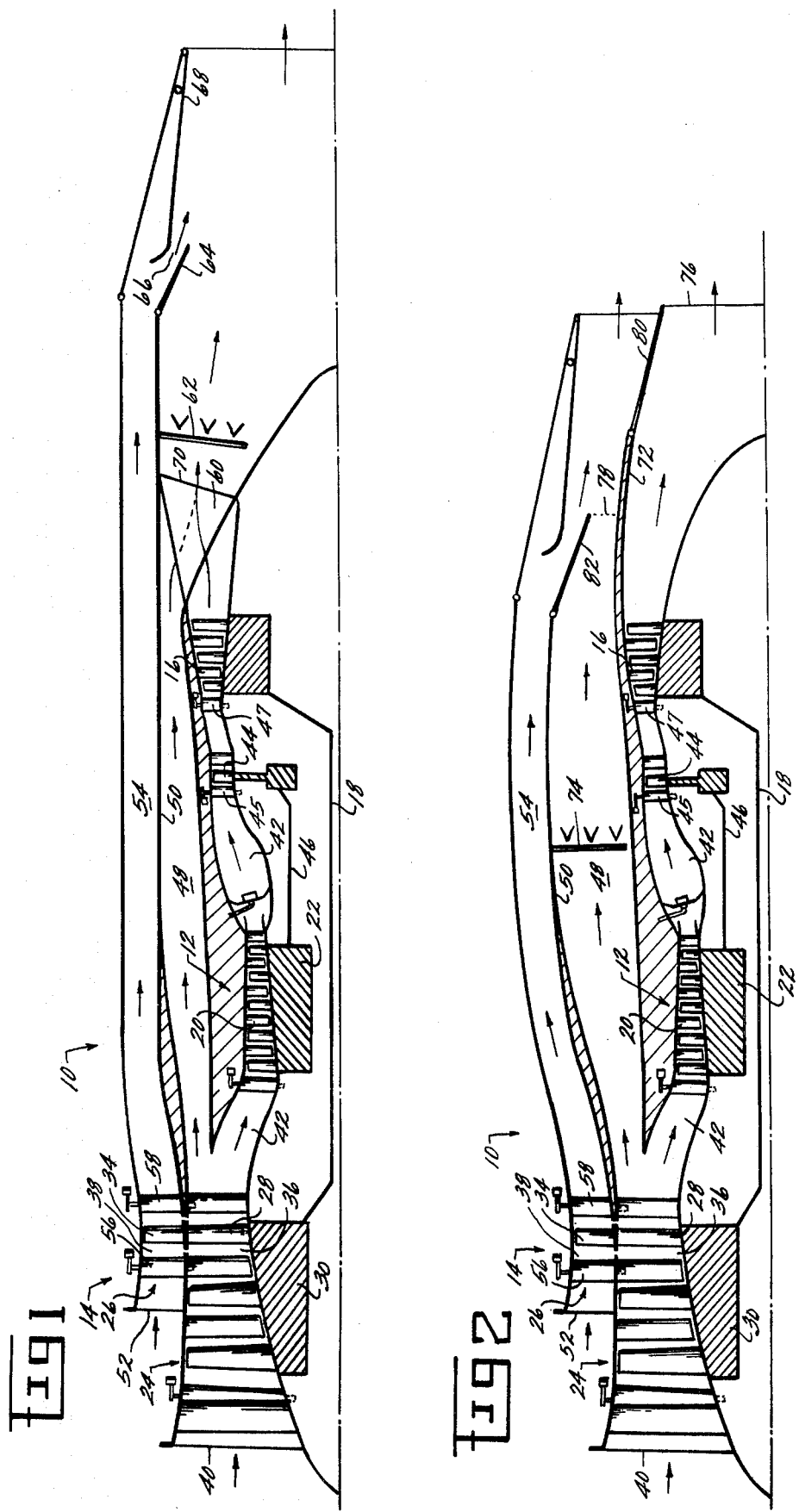

TWO-SPOOL VARIABLE CYCLE ENGINE

This is a continuation of application Ser. No. 538,167, filed Jan. 2, 1975, now abandoned.

BACKGROUND OF THE INVENTION

In the field of gas turbine engines, much attention has been given in recent years, and much future effort will be directed toward, the concept generally referred to as "variable cycle engines." Though the exact definition of what particular characteristics are required of an engine to be classified as a variable cycle engine has not yet been established in the trade, some general characteristics are emerging. Generally, the term variable cycle engine encompasses a hybrid engine which can operate with characteristics approaching both the high bypass ratio dry (the term "dry" referring to non-afterburning and unaugmented) turbofan engine for optimum subsonic operation and the afterburning turbojet for optimum supersonic mission requirements.

In a gas turbofan engine a quantity of air is initially compressed by a fan disposed within an annular duct. A portion of this compressed air is normally ducted to a core engine where it is further compressed, combusted with a mixture of fuel, expanded through a turbine where energy is extracted to drive the compressor and fan, and discharged through a nozzle to provide a propulsive force. The remainder of the air compressed by the fan is ducted around the core engine where it too is exhausted through a nozzle to provide additional propulsive force. The ratio of the quantity of flow bypassing the core engine to that passing through it is referred to as "bypass ratio."

The need for variable cycle engines has arisen because of multimode or changing mission requirements of a particular engine. The need will become more severe in the future when more stringent federal aircraft noise standards are adopted since higher bypass ratio engines are inherently quieter than the same size engine (thrust-wise) of lower bypass ratio for reasons well known in the art. At the same time, such high bypass ratio engines are not necessarily the optimum configuration for supersonic aircraft performance. Current aircraft having multimission requirements are powered by engines which themselves are a compromise between a subsonic high bypass ratio turbofan and a supersonic augmented turbojet. As a result, what emerges is a compromised low-to-moderate bypass ratio turbofan engine.

General characteristics which are desirable in variable cycle gas turbine engines include:

1. Wide range in operating bypass ratio. In other words, high bypass ratio, low specific thrust operation for economical extended subsonic operation and low bypass ratio, high specific thrust operation for supersonic cruise.
2. Ability to provide a given thrust over a considerable range of air flows to facilitate inlet air flow matching and to minimize installation drag.
3. Ability to accomplish the aforementioned changes with a minimum variation in engine geometry and component aerodynamic loading.
4. Ability to modulate between modes of operation smoothly and continuously.
5. Mechanical and control simplicity.

The present invention incorporates a uniquely simple arrangement whereby all of the foregoing objectives can be accomplished.

The complexity of prior art approaches to the variable cycle engine has inhibited their development. Prior attempts have included retractable fans and inefficient combinations of variable area turbines and variable pitch fans and compressors. Some reported approaches involve a "compound" engine which is designed to utilize a pair of engines in tandem with one or both engines functioning depending upon the mode of operation. The weight associated with that portion of the engine which is unused during certain operating modes is an inherent disadvantage in aircraft applications.

A more recent attempt at designing a practical variable cycle engine involves inversion of fan streams flowing through concentric annular ducts (U.S. Pat. No. 3,792,584 — Klees). The complexity of the necessary switch-over mechanism (rotation of one portion of the engine fan duct relative to the remainder) is one undesirable feature of such a concept, as is the increased length required for the system.

Other attempts involve switching a fan stream through alternative fan ducts. A valving mechanism is used to perform the switch over between the ducts. One undesirable feature of this type variable cycle engine is the fact that fan stall may be induced during the switching modes when flow may be retarded.

The present invention overcomes such disadvantages by providing for two separate fan ducts and means for modulating air flows therethrough without the necessity of "dead weight" redundancy or mechanical complexity.

SUMMARY OF THE INVENTION

It is, therefore, a primary object of the present invention to provide an improved modulating variable bypass ratio turbofan engine of a simplified form having the capability of operating efficiently at subsonic and supersonic speeds and of achieving variability between these operating modes without going through a stall condition.

This and other objects and advantages will be more clearly understood from the following detailed description, the drawing and specific examples, all of which are intended to be typical of rather than in any way limiting to the scope of the present invention.

Briefly stated, the above object is attained by incorporating a wide flow range auxiliary fan on the periphery of at least a portion of the conventional fan. Other flow modulating components such as variable guide vanes and nozzles are utilized in conjunction therewith to obtain a wide range of possible operating bypass ratios.

DESCRIPTION OF THE DRAWING

While the specification concludes with claims particularly pointing out and distinctly claiming the subject matter of the present invention, it is believed that the invention will be more fully understood from the following description of the preferred embodiments which are given in connection with the accompanying drawing in which:

FIG. 1 is a diagrammatic representation of an engine incorporating one embodiment of the present invention; and FIG. 2 is a diagrammatic representation, similar to FIG. 1, of an engine incorporating another embodiment of the present invention.

DESCRIPTION OF THE PREFERRED EMBODIMENTS

Referring to the drawing wherein like numerals correspond to like elements throughout, reference is directed to FIG. 1 wherein an engine depicted generally at 10 embodying the present invention is diagrammatically shown. The engine may be considered as comprising generally a core engine 12, a fan assembly 14, and a fan turbine 16 which is interconnected to fan assembly 14 by a shaft 18 to drive the fan assembly. The core engine includes an axial flow compressor 20 having a rotor 22. The fan assembly is depicted as comprising an inner, first compression means or fan 24 and an outer, auxiliary compressor means or fan 26. The inner fan 24 is shown as a three-stage machine, each stage comprising alternating, rotating and stationary blade rows in the normal manner of a fan or compressor. It is recognized that the number of stages or the particular arrangement required in the fan, just as in a compressor or turbine, is dependent upon the particular cycle requirements, and nothing herein is intended to limit the configuration or arrangement of any such turbomachinery component. Therefore, the term "core engine" is intended to means a compressor, a combustor and a turbine in serial flow relationship as is well known in the art. Also, the term "driven fan assembly" is intended to mean a fan compressor having an auxiliary compression means associated therewith.

Continuing with the engine of FIG. 1, the outer auxiliary fan 26 is shown to be disposed outwardly of the inner fan 24 and to include at least one rotating row of fan blades 34 which comprise a radial extension of an inner fan rotating blade row 28. Thus, at least one rotating row of fan blades is shown to span both the concentric inner and outer fan annuli 36 and 38, respectively. Accordingly, the auxiliary fan 26 is considered to be driven by inner fan 24. For fighter-type aircraft where higher pressure ratios are required, it is conceivable that a plurality of inner fan rotating blade rows will be provided with radial extensions to comprise a multi-stage outer fan.

In the embodiment of FIG. 1, air entering annulus 36 via inlet 40 is initially compressed by inner fan 24. A first portion of this compressed air enters inlet 42, is further compressed by the axial flow compressor 20 and is then discharged to a combustor 42 where fuel is burned to provide high energy combustion gases which drive a core engine turbine 44 featuring a variable area turbine nozzle 45. The turbine 44, in turn, drives the rotor 22 through a shaft 46 in the usual manner of a gas turbine engine. (Gas turbine engines having two shafts such as 18 and 46 are commonly called "two-spool machines.") The hot gases of combustion then pass to and drive the fan turbine 16, featuring variable area turbine nozzle 47, which in turn drives the fan assembly 14. Variable area turbine nozzles 45 and 47 may be of the simply supported variety, or of the cantilevered type as described in co-pending U.S. patent application Ser. No. 532,701, McDonough et al. which is assigned to the same assignee as the present invention and the disclosure of which is incorporated herein by reference. The variable turbine nozzle 45 is used to set the core engine operating line (pressure ratio, motive fluid flow relationship) while variable turbine nozzle 47 sets the relationship between the core engine 12 speed and the fan assembly 14 speed. A second portion of the air exiting inner fan 24 enters an inner annular fan duct 48 defined, in part, by core engine 12 and a circumscribing flow path boundary 50.

Air entering annulus 38 via inlet 52, as an auxiliary flow of air, is compressed by the outer fan 26 driven by fan turbine 16 through a fan rotor 30, and passes into an outer annular fan duct 54. The outer fan is shown with modulating means such as variable inlet and outlet guide vanes, 56 and 58, respectively, to allow it to be operated at full flow at high bypass ratio conditions and at low flow at low bypass ratio conditions.

For supersonic operation, the outer fan duct 54 auxiliary air flow is desired to be as low as possible. Of concern must be the degree to which the auxiliary air flow through the outer duct 54 can be reduced for high Mach number operation. Complete shut off is probably impractical and undesirable due to air resistance losses and internal local heating. Furthermore, at supersonic flight conditions, inlets generally produce a tip radial pressure distortion pattern and it would be desirable to pass this low energy flow region through the outer fan duct 54. Accordingly, during supersonic operation the variable guide vanes 56 and 58 (which operate as louvers) are set for their minimum flow conditions.

Air flow passing through the inner fan assembly 24 is split into the inner fan duct 48 and core engine 12. These flows are rejoined and mixed in a mixer 60 of the well-known variety. There is provided a second, or auxiliary, combustor 62, of the afterburning-type well known and used in the art, to which fuel and the mixture of gases are delivered for combustion therein to produce an exhaust stream. The exhaust stream then passes through a variable area primary nozzle system 64 and is joined by the compressed outer fan duct 54 flow which passes through a communication means such as opening or nozzle 66 between a variable secondary nozzle system 68 and the primary system 64. The size of opening 66 must be compatible with the quantity and condition of the outer duct 54 flow. Thus, for supersonic operation the bypass ratio (flows through outer duct 54 plus inner duct 48, divided by flow through core engine 12) is low and the specific thrust is high.

For subsonic cruise operation, the second combustor 62 is not employed. The outer duct 54 flow is increased to a maximum through modulation of the variable guide vanes 56, 58 and opening 66, causing reduction of the inner fan 24 rotation speed and thereby producing a reduction in pressure ratio. As expected, this lower pressure is carried through to the mixing plane 70 of mixer 60 and reduces the pressure at the discharge of fan turbine 16. Therefore, the fan turbine 16 is capable of doing more work to match the increased requirements of the outer fan 26. Appropriate changes in areas of variable area turbine nozzles 45 and 47 and primary exhaust nozzle 64 allow matching of the fan assembly 14 and core engine 12 to optimum operating conditions.

The variable cycle concept hereinbefore described may also be applied to a two-spool, duct burning, separated flow turbofan engine as depicted in the embodiment of FIG. 2. Therein, the mixer 60 of FIG. 1 has been removed and a splitter 72 added to separate the flow exiting turbine 16 from that of the inner fan duct 48. The basic difference between the two embodiments is that in the supersonic mode an auxiliary duct combustor 74 augments only the inner fan duct 48 flow and the throat areas 76 and 78 of a core engine nozzle 80 and an inner fan duct nozzle 82, respectively, are controlled separately in a manner such as to obtain optimum performance. The increased energy necessary to drive outer, auxiliary fan 26 in the subsonic mode can be obtained by increasing the throat area 76, thereby dropping the pressure at the discharge of the fan turbine 16.

The manner in which the variable cycle concept applies in the two described embodiments is substantially similar. However, the embodiment of FIG. 1 has the inherent restraint that the static pressures in the inner fan duct 48 and the combustion gases exiting the core engine 12 must be equal at the mixing plane 70.

Thus, it becomes apparent that fan turbine 16 functions as an energy management system, capable of providing the required energy for either operating mode, whether it be the high pressure ratio, low flow mode, characteristic of supersonic operation or the low pressure ratio, high flow mode characteristic of efficient subsonic operation.

It should be obvious to one skilled in the art that certain changes can be made to the above-described engine without departing from the broad inventive concepts thereof. For example, it is conceivable that the outer fan duct 54 auxiliary flow could be ducted to discharge into and thereby fill high drag producing regions of the aircraft installation to improve overall system performance. In another embodiment, the auxiliary flow could be blown over or through wing flaps to augment lift in the well-known manner. In either case, the opening 66 may not be required. Furthermore, in some configurations, the variability of some or all of the turbine and exhaust nozzles may not be required. It is intended that the appended claims cover these and all similar variations in Applicants' broader inventive concepts.

What is claimed is:

1. A variable cycle gas turbofan engine comprising:
   a core engine including a compressor, a combustor and a core turbine;
   a stage or rotatable fan blades for pressurizing a motive fluid, a first portion of which enters said core engine and is discharged therefrom in a hot gas stream, and a second portion of which passes as a bypass stream through a first substantially annular duct generally surrounding said core engine;
   auxiliary compression means comprising a radial extension of said fan blades for pressurizing an auxiliary motive fluid stream;
   means for modulating the flow rate of the auxiliary fluid stream between a high flow rate during a subsonic operating mode and an essentially zero flow rate during a supersonic operating mode;
   fan turbine means driven by said hot gas stream for rotationally driving both said fan blades and said auxiliary compression means in the subsonic and supersonic operating modes;
   auxiliary combustion means to which fuel and the bypass stream are delivered for combustion therein during the supersonic operating mode; and
   first variable area nozzle means for exhausting the hot gas stream.

2. The variable cycle gas turbofan engine as recited in claim 1 wherein the auxiliary motive fluid stream discharges into a second substantially annular duct partially surrounding said first annular duct;
   and further comprising means disposed upstream of said auxiliary compression means for guiding the auxiliary fluid stream into said auxiliary compression means.

3. The variable cycle gas turbofan engine as recited in claim 2 wherein said fan turbine means is of the variable area type.

4. The variable cycle gas turbofan engine as recited in claim 2 wherein said guiding means comprises a first stage of nonrotatable, variable area guide vanes.

5. The variable cycle gas turbofan engine as recited in claim 4 further comprising a second stage of nonrotatable, variable area guide vanes disposed axially downstream of said auxiliary compression means.

6. The variable cycle gas turbofan engine as recited in claim 2 wherein said auxiliary combustion means is disposed substantially within said first annular duct.

7. The variable cycle gas turbofan engine as recited in claim 6 further comprising second variable area nozzle means for exhausting the combusted bypass stream.

8. The variable cycle gas turbofan engine as recited in claim 7 further comprising means for fluidly communicating said auxiliary motive fluid stream with said combusted bypass stream prior to exiting the engine.

9. The variable cycle gas turbofan engine as recited in claim 8 wherein said fluid communicating means is of the variable area orifice type.

10. The variable cycle gas turbofan engine as recited in claim 2 further comprising means for mixing the bypass stream and the hot gas stream to form a mixture thereof during the supersonic operating mode.

11. The variable cycle gas turbofan engine as recited in claim 10 wherein said auxiliary combustion means is disposed downstream of said mixing means to receive the mixture during the supersonic operating mode.

12. The variable cycle gas turbofan engine as recited in claim 11 wherein the combusted mixture is discharged sequentially from said auxiliary combustion means and said first variable area nozzle means.

13. The variable cycle gas turbofan engine as recited in claim 12 wherein said means for modulating comprises a variable area orifice between the downstream end of the second annular duct and said first variable area nozzle.

14. In a method of operating a variable cycle gas turbofan engine, the steps of:
   pressurizing a motive fluid, a first portion of which enters a core engine to be discharged therefrom in a hot gas stream, and a second portion of which passes as a bypass stream through a first substantially annular duct surrounding the core engine;
   driving a turbine with the hot gas stream;
   driving, with said turbine, means for pressurizing an auxiliary motive fluid stream in a second substantially annular duct surrounding said first annular duct;
   modulating the flow rate of said auxiliary fluid stream between a positive flow rate during a subsonic operating mode and an essentially zero flow rate during a supersonic operating mode while maintaining hot gas stream flow through said turbine in both operating modes;
   mixing fuel with the bypass stream and combusting the resulting mixture during the supersonic operating mode; and
   exhausting the hot gas stream through a variable area nozzle.

* * * * *